US008539100B2

(12) United States Patent
Liu et al.

(10) Patent No.: US 8,539,100 B2
(45) Date of Patent: Sep. 17, 2013

(54) METHOD, DEVICE, AND COMMUNICATIONS SYSTEM FOR MANAGING QUERYING MAPPING INFORMATION

(75) Inventors: Ya Liu, Shenzhen (CN); Xiaohu Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 349 days.

(21) Appl. No.: 12/955,658

(22) Filed: Nov. 29, 2010

(65) Prior Publication Data

US 2011/0072157 A1    Mar. 24, 2011

Related U.S. Application Data

(63) Continuation of application No. PCT/CN2009/071660, filed on May 6, 2009.

(30) Foreign Application Priority Data

May 29, 2008  (CN) .......................... 2008 1 0028535

(51) Int. Cl.
*G06F 15/173* (2006.01)

(52) U.S. Cl.
USPC ............................ 709/238; 709/227; 709/248

(58) Field of Classification Search
USPC ......................................... 709/227, 238, 248
See application file for complete search history.

(56) References Cited

U.S. PATENT DOCUMENTS

| | | | |
|---|---|---|---|
| 6,192,051 B1 * | 2/2001 | Lipman et al. ................. | 709/238 |
| 7,664,876 B2 * | 2/2010 | Garcia-Luna-Aceves et al. ............................ | 709/238 |
| 8,219,708 B2 * | 7/2012 | Bachmann et al. ........... | 709/238 |
| 2002/0103934 A1 * | 8/2002 | Fishman et al. ............... | 709/246 |
| 2003/0065817 A1 * | 4/2003 | Benchetrit et al. ............ | 709/245 |
| 2006/0120315 A1 * | 6/2006 | Olivereau et al. ............. | 370/313 |
| 2006/0215684 A1 * | 9/2006 | Capone ......................... | 709/227 |
| 2008/0222290 A1 * | 9/2008 | Le Moigne et al. ........... | 709/226 |
| 2009/0238188 A1 | 9/2009 | Xu et al. | |
| 2011/0286471 A1 * | 11/2011 | Capone et al. ................ | 370/469 |

FOREIGN PATENT DOCUMENTS

CN           101123536 A        2/2008

OTHER PUBLICATIONS

Lynn, C. et al. "X.509 Extensions for IP Addresses and AS Identifiers" The Internet Society. Jun. 2004.
BiJun et al. "A Source Address Validation Test-Bed in CNGI-Cernet" Telecommunications Science. Jan. 15, 2008:11-18.
International Search Report issued in corresponding PCT Application No. PCT/CN2009/071660; mailed Aug. 13, 2009.

(Continued)

*Primary Examiner* — Phuoc Nguyen
(74) *Attorney, Agent, or Firm* — Brinks Hofer Gilson & Lione

(57) ABSTRACT

The present invention discloses a method, a device, and a communications system for managing and querying mapping information. The method for managing mapping information includes: signing a mapping information pair by using a private key of a certificate corresponding to a prefix in the mapping information pair to generate a signed mapping pair; submitting the signed mapping pair to a registration agent (RA) in a transit network; and sharing, by the RA, the signed mapping pair with other RAs through data synchronization. With the mapping information management method, data transmission method, devices and communications system provided by the present invention, the security of mapping information in registration, query, and synchronization operations is guaranteed.

12 Claims, 14 Drawing Sheets

(56) References Cited

OTHER PUBLICATIONS

Written Opinion of the International Searching Authority issued in corresponding European Patent Application No. PCT/CN2009/071660, mailed Aug. 13, 2009.
Extended European Search Report issued in corresponding European Patent Application No. 09753457.2, mailed Apr. 5, 2011.
Lynn et al., "Secure BGP (S-BGP)" draft-clynn-s-bgp-protocol-01.txt, Internet Engineering Taskforce. Jun. 2003. XP 15000564A.
Lynn et al., "x.509 Extensions for IP Addresses and AS Identifiers", Network Working Group. Jun. 2004. XP 15009559A.
Ng, "Extensions to BGP to Support Secure Origin BGP (soBGP)" draft-ng-sobgp-extensions-02.txt, Network Working Group. Apr. 2004.
Zhao et al., "The Performance Impact of BGP Security", IEEE Network, Nov./Dec. 2005. XP 1512559A.
Communication issued in corresponding European Application No. 09753457.2, mailed Nov. 2, 2012.

* cited by examiner

| X.509 v3 |
| --- |
| Serial # = xx.xx.xx |
| Signed Algorithm = PKCS #1 |
| Issuer = China Netcom |
| Expiration date = 2008/01/01 - 2008/12/31 |
| Subject = Organization A |
| Subject Public Key Info |
| Prefix = 10.2.1.0/24 |
| ... |

FIG. 9

| X.509 v3 |
|---|
| Serial # = xx.xx.xx |
| Signed Algorithm = PKCS #1 |
| Issuer = China Netcom |
| Expiration date = 2008/01/01 - 2008/12/31 |
| Subject = China Netcom |
| Subject Public Key Info |
| Prefix = 192.1.1.0/24 |
| AS = 100 |
| ... |

METHOD, DEVICE, AND COMMUNICATIONS SYSTEM FOR MANAGING QUERYING MAPPING INFORMATION

CROSS-REFERENCE TO RELATED APPLICATIONS

This application is a continuation of International Application No. PCT/CN2009/071660, filed on May 6, 2009, which claims priority to Chinese Patent Application No. 200810028535.4, filed on May 29, 2008, both of which are hereby incorporated by reference in their entireties.

FIELD OF THE DISCLOSURE

The present disclosure relates to data transmission technology in a communications network, and in particular, to a method, a device and a communications system for managing and querying mapping information.

BACKGROUND OF THE DISCLOSURE

With the wide deployment of multi-homing and traffic engineering (TE) systems, Internet routes are increasing rapidly. This, on the one hand, requires larger-capacity chips for storing oversized routing tables, thus increasing the costs of routers, and on the other hand, results in slower route convergence.

To resolve the problem of oversized routing tables caused by the abrupt increase of routes, as shown in FIG. 1, the Internet is divided into two parts: a transit network that is in the central location of the network and an edge network that connects to the transit network via a border router (BR). The BR knows routing information of the edge network and routing information of the transit network that it connects to, but the routing information will not penetrate each other.

The route prefixes inside the edge network will not be spread to the transit network. Instead, the BR of the edge network registers the prefixes of the edge network with a registration agent (RA) of the transit network. The mapping between a prefix and the BR that registers the prefix is described as mapping information. Each RA maintains a database that stores mapping information, that is, a mapping information database. Multiple RAs in the transit network synchronize information in their mapping information databases via a communications protocol, such as extension of the Border Gateway Protocol (BGP), so that the databases are synchronized and maintain the same mapping information records. After the synchronization, any RA in the transit network knows which BR is to be traversed by a route from the RA to a prefix. In FIG. 1, for example, traffic from edge network A to edge network B will first be routed to BR-A that connects to edge network A. Then, BR-A queries the RA for the mapping information of the longest prefix match with the destination Internet Protocol (IP) address to obtain the information of the BR that registers the mapping information, that is, BR-B. Then, BR-A forwards the packets to BR-B via a tunnel directed to BR-B, such as a Multi-Protocol Label Switching (MPLS) tunnel, an IP in IP tunnel, or a Generic Route Encapsulation (GRE) tunnel. BR-B knows the routing information inside the edge network it connects to and forwards the packets according to its routing table in edge network B until the packets finally reach the destination. This forwarding solution is a forwarding and query separation solution. That is, the RA only responds to the query of mapping information and the traffic between edge networks is not forwarded by the RA.

Some potential security problems in the above separation solution have been discovered:

Security of mapping information registration: an attacker may register false mapping information with the RA by using a fake identity, for example, registering a prefix belonging to someone else.

Security of mapping information query: the attacker may simulate an RA to provide false mapping information to a querier or, for some purposes, alter the information in some mapping information pairs, such as the prefix length and ingress address for example, changing the ingress of edge network B from BR-B to BR-B' in the scenario shown in FIG. 1.

Security of mapping information database synchronization: When the mapping information databases of multiple RAs are synchronized, some RAs may publish false mapping information, for example, publishing a mapping record with an altered prefix length or fabricate a non-existent mapping information pair.

SUMMARY

The object of the embodiments of the present invention is to provide a method for managing mapping information in network routing, a method for querying mapping information, an edge network device, an RA device and a communications system so as to guarantee the security of mapping information in registration, query and synchronization operations.

For the above purpose, a method for managing mapping information in network routing includes:

signing a mapping information pair by using a private key of a certificate corresponding to a prefix in the mapping information pair to generate a signed mapping pair;

submitting the signed mapping pair to an RA in a transit network; and sharing, by the RA, the signed mapping pair with other RAs through data synchronization.

A method for querying mapping information includes:

querying, by a first edge network organization, an RA according to a prefix of a second edge network organization and obtaining a signed mapping pair of the second edge network organization returned by the RA;

checking, by the first edge network organization, whether the signed mapping pair is valid according to signature control information in the signed mapping pair; and after determining that the signed mapping pair is valid through the check, extracting, by the first edge network organization, mapping information in the signed mapping pair.

An edge network device includes:

a signed mapping pair generating unit, configured to sign a mapping information pair by using a private key of a certificate corresponding to a prefix in the mapping information pair to generate a signed mapping pair; and a submitting unit, configured to submit the signed mapping pair to an RA in a transit network.

An RA device includes:

a receiving unit, configured to receive a signed mapping pair submitted by an edge network organization;

a signed mapping pair database unit, configured to store the signed mapping pair received by the receiving unit; and a synchronizing unit, configured to synchronize the signed mapping pair stored by the signed mapping pair database unit to other RAs.

A communications system includes:

an edge network device, configured to sign a mapping information pair with a private key of a certificate corresponding to a prefix in the mapping information pair to generate a signed mapping pair and submit the signed mapping pair to an RA device; and the RA device, configured to receive the signed mapping pair submitted by the edge network device and share the signed mapping pair with other RAs through data synchronization.

With the mapping information management method, the mapping information query method, the devices and the communications system provided in the embodiments of the present invention, a mapping information pair is signed with the private key of a certificate, which ensures the reliability of the mapping information in registration, query and synchronization operations and eliminates the potential security problems of the prior art. Consequently, the reliability of the communications network or system is improved.

BRIEF DESCRIPTION OF THE DRAWINGS

FIG. 9 illustrates a certificate of Organization A according to an embodiment of the present invention;

DETAILED DESCRIPTION OF THE EMBODIMENTS

To better explain the technical solution of the embodiments of the present invention, a method for managing mapping information in network routing, a method for querying mapping information, an edge network device, an RA device, and a communications system provided by the embodiments of the present invention are described hereinafter in detail with reference to the accompanying drawings.

Before the technical solution is explained, it should be noted that, in the description of the embodiments of the present invention, an edge network organization and an edge network device refer to the same object; an RA and an RA device refer to the same object; the first edge network organization and Organization A refer to the same object and the second edge network organization and Organization B refer to the same object.

Figure 1:
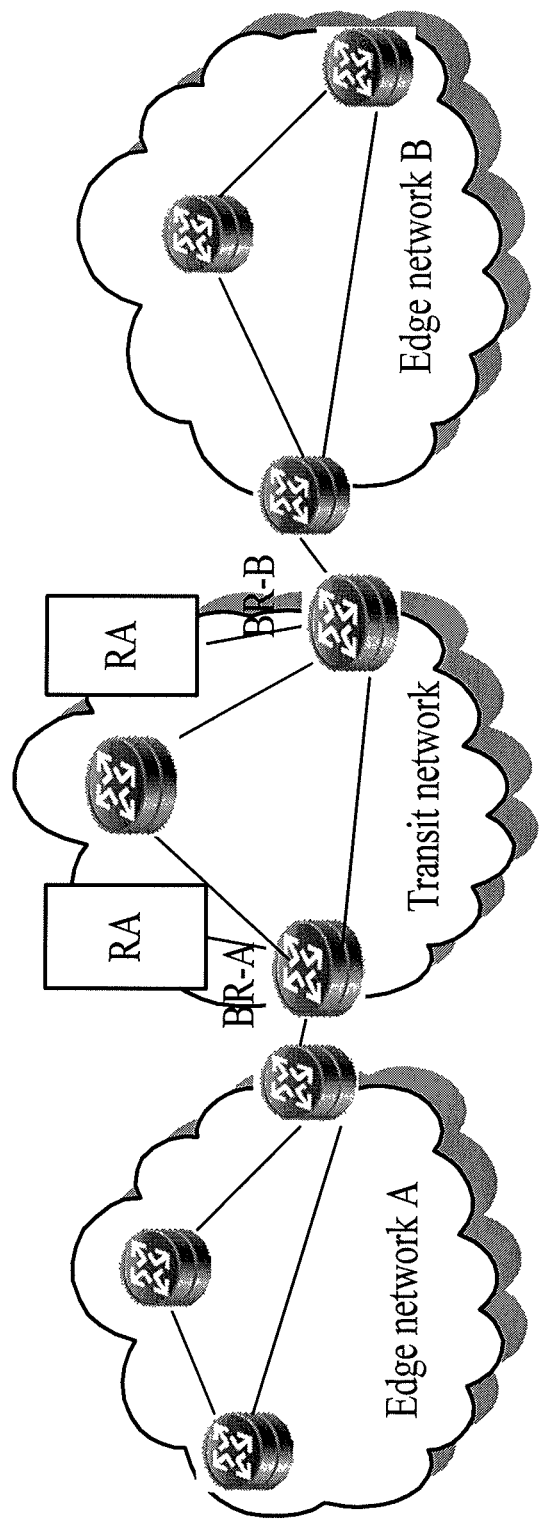
FIG. 1 illustrates an Internet architecture in the prior art.
Figure 2:
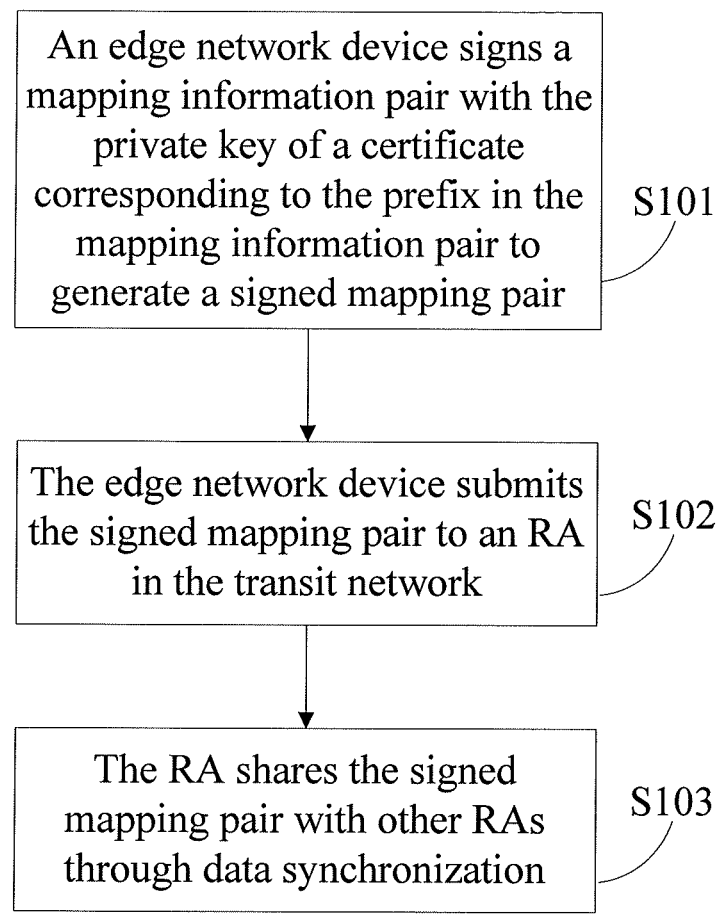
FIG. 2 is a main flowchart of a method for managing mapping information according to an embodiment of the present invention.

FIG. 2 illustrates a flowchart of a method for managing mapping information in network routing according to an embodiment of the present invention. The method includes the following steps:

S101. An edge network device signs a mapping information pair by using the private key of a certificate corresponding to the prefix in the mapping information pair to generate a signed mapping pair.

The mapping information pair includes at least the following information: prefix, IP address of the transit network, and mapping control information.

The signed mapping pair includes at least the following information: prefix, IP address of the transit network, mapping control information, signature control information, and signature. The signature control information includes: certificate information used for the signature, revocation point of the signed mapping pair, expiration date, and signature algorithm.

S102. The edge network device submits the signed mapping pair to an RA in the transit network.

S103. The RA shares the signed mapping pair with other RAs through data synchronization. In particular, the RA may set an independent signed mapping pair database to store the signed pair.

The RAs synchronize their signed mapping pair databases by taking a signed mapping pair as the basic unit of record and respond to queries by providing the requested signed mapping pair. A lifetime is embedded in each signed mapping pair. Signed mapping pairs whose lifetime expires will be discarded. The RA does not accept or distribute a signed mapping pair whose lifetime expires. When a querier receives the signed mapping pair, the querier checks the signature on the mapping pair according to the certificate information and signature algorithm information. The querier will not carry out subsequent processing until the signature check is successful.

Steps S101 and S102 may be implemented as follows:

a. The edge network device signs the prefix and the autonomous system (AS) number of the transit network by using the private key of the certificate corresponding to the prefix to generate a first signed mapping pair and submits the first signed mapping pair to the transit network organization.

b. The transit network organization signs the first signed mapping pair according to the certificate that contains the AS number to generate a second signed mapping pair and submits the second signed mapping pair to the RA in the network.

The method for managing mapping information in network routing according to the embodiment of the present invention is described above in an overall sense. Those skilled in the art understand that, in the way of signing a mapping information pair by using the private key of a certificate according to the embodiment of the present invention, the reliability of mapping information in registration, query and synchronization operations is guaranteed and the potential trouble of the prior art is eliminated.

Figure 3:
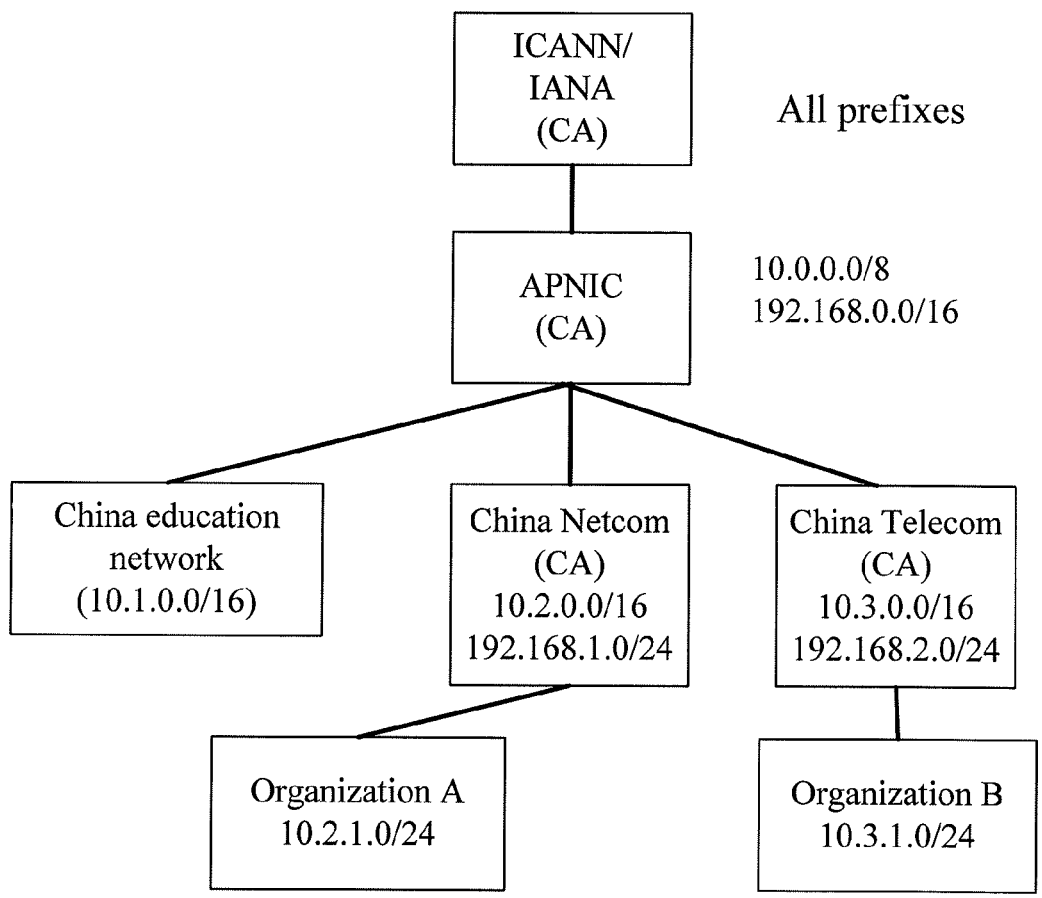
FIG. 3 illustrates prefix and certificate assignment according to an embodiment of the present invention.

The technical solution of the embodiments of the present invention is explained below by taking the public key infrastructure (PKI) certificate as an example. As shown in FIG. 3, the top prefix and AS management organization in the world is the Internet Assigned Numbers Authority (IANA), under which five level-1 regional agents are set. The agent in the Asia-Pacific region is the Asia-Pacific Network Information Center (APNIC). Thus, operators in the Asia-Pacific region, such as China Mobile, China Telecom, and China Netcom, and other organizations that require network prefixes and AS numbers, such as China education network, can submit applications to the APNIC for IP addresses and AS numbers. An operator may also act as an agent in the coverage area of its network. For example, China Netcom may receive prefix applications from organizations in the Beijing area. FIG. 3 demonstrates the prefix assignment from the IANA to an end organization as well as the corresponding resource certificate verification path with regard to the exemplary network segment 10.0.0.0/8.

In FIG. 3, certificate authorities (CAs) include IANA, APNIC, China Netcom, and China Telecom and organizations that are granted resource certificates are China education network, Organization A, and Organization B. China Netcom and China Telecom own transit networks they practically operate. They require IP prefixes and AS numbers. Therefore, they also assign appropriate resource certificates to their transit networks. The prefixes and AS numbers of different resource certificates are mutually exclusive. That is, in FIG. 3, where China Netcom has assigned the prefix 10.2.1.0/24 to Organization A, it will not be able to assign the prefix to Organization B or the transit network of China Netcom itself. A user network may also apply for independent IP address sections directly from the IANA. When the user changes an access network, renumbering of internal network addresses is unnecessary.

Figure 4:
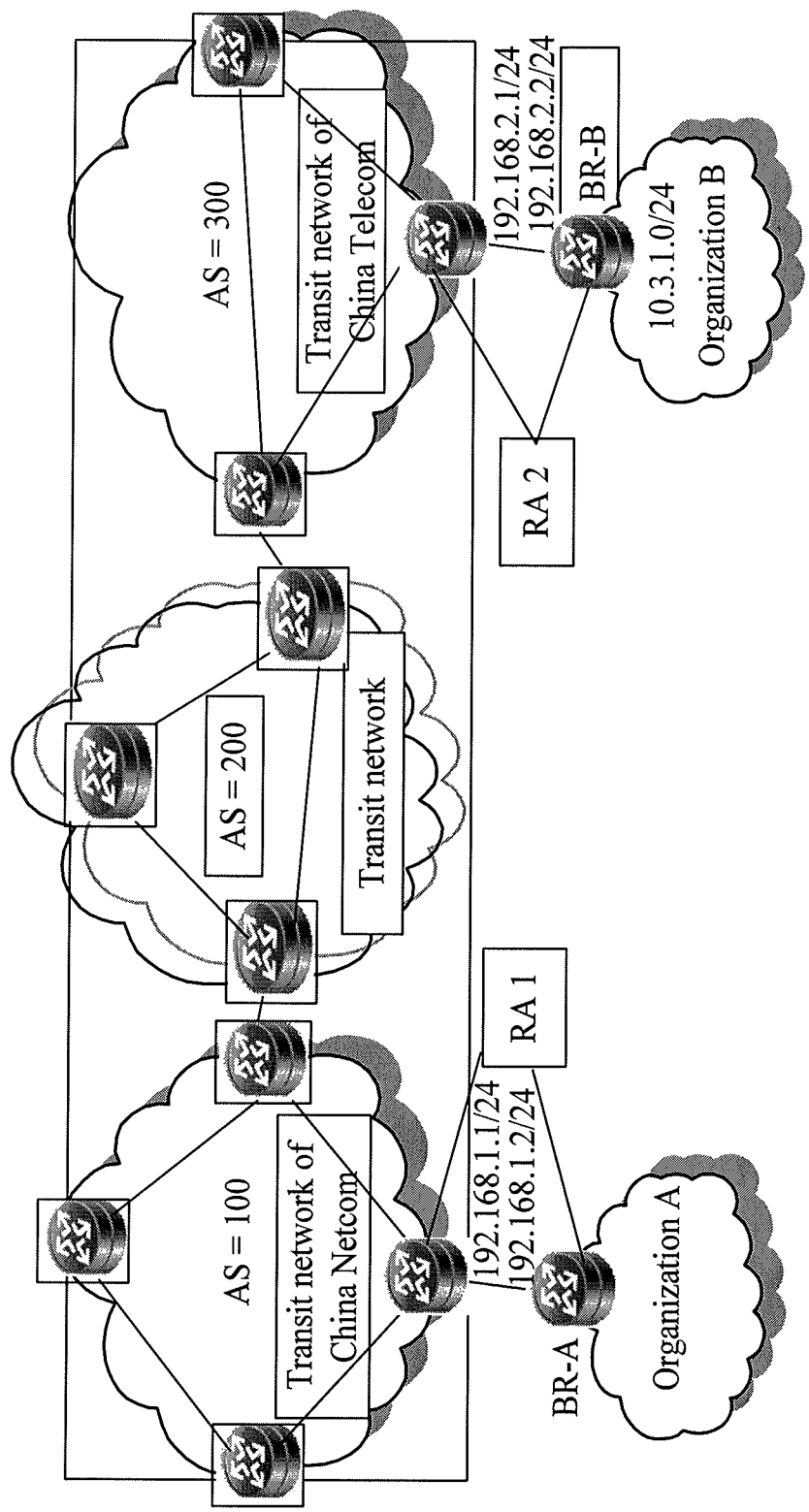
FIG. 4 illustrates an application scenario of an embodiment of the present invention.

The technical solution of the embodiments of the present invention is explained below under the network architecture shown in FIG. 4 with reference to the method steps shown in FIG. 5, FIG. 6, FIG. 7, and FIG. 8.

Figure 5:
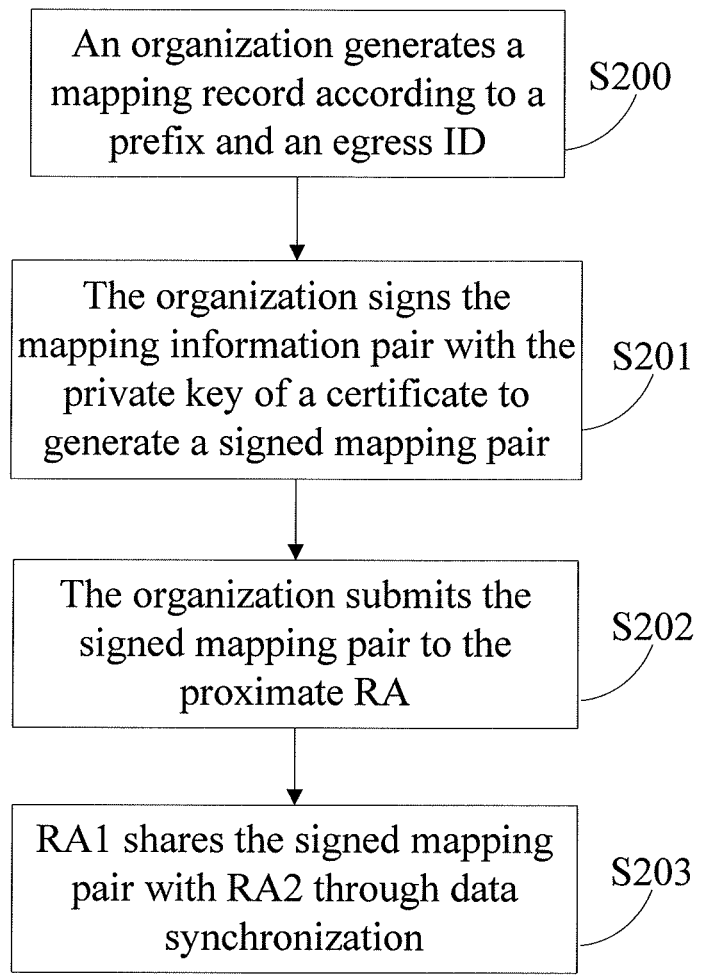
FIG. 5 illustrates a method for managing mapping information according to a first embodiment of the present invention.

Assume that the X.509 v3 certificate format in PKI is adopted. As shown in FIG. 9, Organization A obtains a certificate through the certificate distribution mode shown in FIG. 3. Assume that Organization A and Organization B connect to the transit networks of China Netcom and China Telecom respectively. The prefixes of Organization A and Organization B will not be distributed to the transit networks. The prefix 10.2.1.0/24 of Organization A will be mapped to the address 192.168.1.2 in the transit network and the prefix 10.3.1.0/24 of Organization B will be mapped to the address 192.168.2.2 in the transit network. As shown in FIG. 5, the procedure where Organization A and Organization B register and synchronize mapping information includes:

S200. The two organizations generate mapping information pairs according to prefixes and the egress IDs matching the prefixes.

The mapping information pair of Organization A is {prefix=10.2.1.0/24, transit IP=192.168.1.2, mapping control information}; the mapping information pair of Organization B is {prefix=10.3.1.0/24, transit IP=192.168.2.2, mapping control information}.

S201. Organization A signs its mapping information pair by using the private key of its resource certificate and generates the signed mapping pair {prefix=10.2.1.0/24, transit IP=192.168.1.2, mapping control information, signature control information, Signature A}.

Accordingly, Organization B generates a signed mapping pair {prefix=10.3.1.0/24, transit IP=192.168.2.2, mapping control information, signature control information, Signature B} in the same manner.

S202. The two organizations submit the signed mapping pairs to appropriate RAs in the transit network.

Preferably, a signed mapping pair is submitted to the proximate RA. That is, the signed mapping pair of Organization A is submitted to the proximate RA1 and the signed mapping pair of Organization B is submitted to the proximate RA2.

S203. The RA shares the signed mapping pair with other RAs through data synchronization. Specifically, RA1 and RA2 synchronize their databases so that the signed mapping database of RA1 has the signed mapping pair of Organization B and that the database of RA2 has the signed mapping pair of Organization A.

Figure 6:
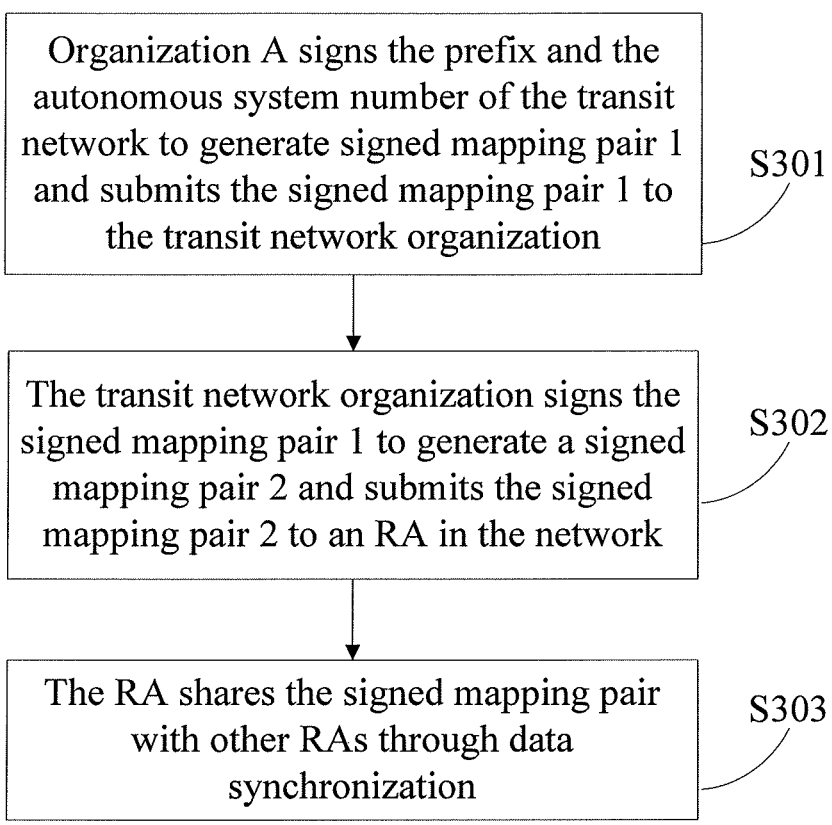
FIG. 6 illustrates a method for managing mapping information according to a second embodiment of the present invention.

In practice, steps S201 to S203 may be implemented in the following mode. Organization A is taken as an example for illustration. In the case of Organization B, the implementation is the same. As shown in FIG. 6, the implementation includes:

S301. Organization A signs the mapping information pair {10.2.1.0/24, 100} by using the private key of the certificate corresponding to the prefix 10.2.1.0/24 in the mapping information pair to generate signed mapping pair 1 {prefix=10.2.1.0/24, AS#=100, signature control information 1, signature 1}, and submits the signed mapping pair 1 to the transit network organization (the transit network of China Netcom shown in FIG. 4).

Figures 10, 11:
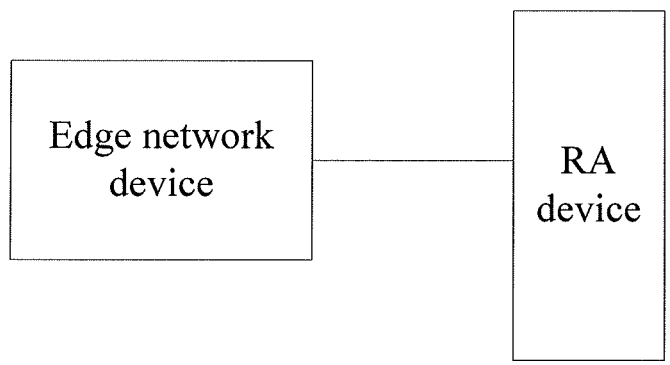
FIG. 10 illustrates a certificate of a transit network organization according to an embodiment of the present invention.
FIG. 11 illustrates the structure of a communications system according to an embodiment of the present invention.

S302. The transit network of China Network signs the signed mapping pair 1 submitted by Organization A with the resource certificate (the format of which is shown in FIG. 10) that contains its AS# (100) to generate a signed mapping pair 2 {{prefix=10.2.1.0/24, AS#=100, signature control information 1, signature 1}, transit IP=192.168.1.2, mapping control information, signature control information 2, signature2}, and submits the signed mapping pair 2 to RA1.

S303. RA1 shares the signed mapping pair 2 with other RAs (RA2) through data synchronization.

The technical solution shown in FIG. 6 reduces the coupling of management and improves the flexibility of reassigning the routable address of a border router in the transit network. An organization only needs to know the AS# of the authorized transit network. This AS# does not change frequently. The routable address of a specific border router in the transit network is completely decided by the transit network and can be dynamically reassigned many times. As long as the AS# is not changed, a new signature of the prefix organization is unnecessary.

Accordingly, a method for querying mapping information is provided in an embodiment of the present invention. The method is explained below with reference to FIG. 7.

Figure 7:
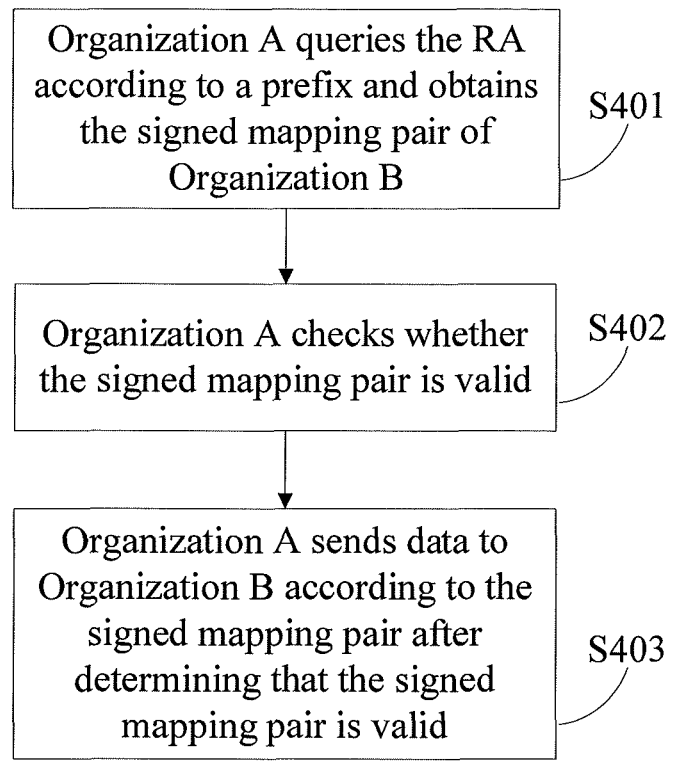
FIG. 7 is a flowchart of a method for querying mapping information according to an embodiment of the present invention.

When Organization A attempts to send data to Organization B, Organization A first checks whether BR-A has the mapping information corresponding to the prefix of Organization B. If BR-A has the mapping information corresponding to the prefix of Organization B, Organization A sends data to Organization B directly according to the mapping information. Otherwise, the steps shown in FIG. 7 are executed.

S401. Organization A queries RA1 according to the prefix 10.3.1.0/24 of Organization B and obtains the signed mapping pair {prefix=10.3.1.0/24, transit IP=192.168.2.2, mapping control information, signature control information, Signature B} returned by RA1. In fact, Organization A can obtain the signed mapping pair of Organization B by querying either RA1 or RA2 according to the prefix 10.3.1.0/24 of Organization B.

S402. Organization A checks whether the signed mapping pair is valid according to the signature control information in the signed mapping pair, including:

checking whether the certificate format is qualified;

checking whether the expiration date of the signed mapping pair has arrived;

checking whether the certificate of Organization B is credible and whether the certificate has expired; and verifying whether the signature field in the signed mapping pair is valid with the public key in the certificate of Organization B.

BR-A regards the signed mapping pair as valid only when the check is successful.

S403. After determining that the signed mapping pair is valid through the check, Organization A sends data to Organization B according to the mapping information in the signed mapping pair.

As seen from the above, with the mapping information query method provided in the embodiment of the present invention, a mapping information pair is signed by using the private key of an X.509v3 certificate. When the mapping information is queried, the signature of the signed mapping pair is verified and the signed mapping pair is valid only when the verification is successful. Thus, the method prevents an attacker from providing false information to the querier under the disguise of an RA. The method also prevents an RA from altering mapping information and thus improves the reliability of mapping information query and eliminates the potential security problems of the prior art. Consequently, the reliability of the communications network or system is improved.

Figure 8:
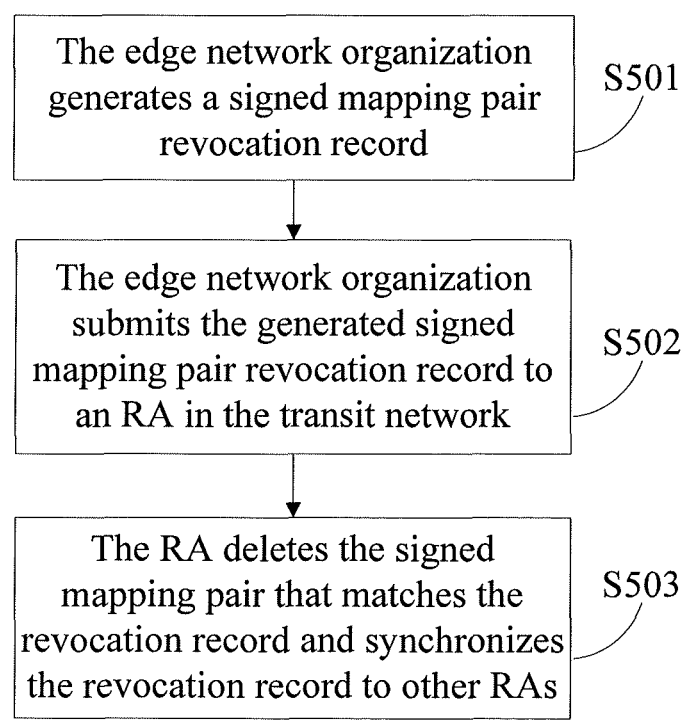
FIG. 8 illustrates a method for managing mapping information according to a third embodiment of the present invention.

In a network routing management method according to an embodiment of the present invention, the edge network organization may revoke a signed mapping pair it has registered with the RA. Specifically, taking Organization A as an example, as shown in FIG. 8, the revocation process includes:

S501. Organization A generates a signed mapping pair revocation record in the primary form {{prefix=10.2.1.0/24, transit IP=192.168.1.2, mapping control information}, revocation signature control information, Revocation Signature A}.

S502. Organization A sends the generated signed mapping pair revocation record to the signed mapping pair revocation record database of the proximate RA1. In fact, Organization A may send the generated signed mapping pair revocation record to the signed mapping pair revocation record database of either RA1 or RA2.

S503. RA1 deletes the signed mapping pair matching the signed mapping pair revocation record from the signed mapping pair database and synchronizes the signed mapping pair revocation record to the signed mapping pair revocation record databases of other RAs (such as RA2). The other RAs (such as RA2) delete the signed mapping pair matching the signed mapping pair revocation record from their signed mapping pair databases.

In the case that Organization B desires to revoke its signed mapping pair, steps similar to those described above are executed and will not be described here again.

With the mapping information management method provided in the embodiment of the present invention, a mapping information pair is signed by using the private key of an X.509v3 certificate, which ensures the reliability of the mapping information in registration, query and synchronization operations and eliminates the potential security problems of the prior art. Consequently, the reliability of the communications network or system is improved.

Based on the method for managing and querying mapping information according to the above embodiments of the present invention, an embodiment of the present invention provides a communications system. As shown in FIG. 11, the system includes:

an edge network device, configured to sign a mapping information pair by using the private key of a certificate corresponding to the prefix in the mapping information pair to generate a signed mapping pair and submit the signed mapping pair to an RA device; and the RA device, configured to receive the signed mapping pair submitted by the edge network device and share the signed mapping pair with other RAs through data synchronization.

Figure 12:
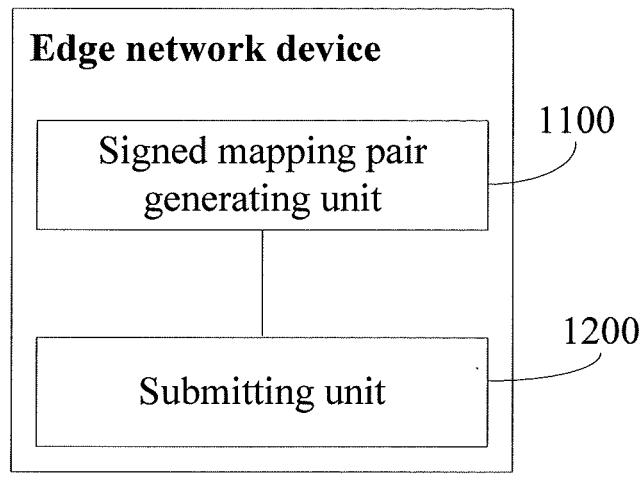
FIG. 12 illustrates an edge network device according to a first embodiment of the present invention.

FIG. 12 illustrates an edge network device according to a first embodiment of the present invention. The edge network device includes:

a signed mapping pair generating unit 1100, configured to sign the mapping information pair by using the private key of the certificate corresponding to the prefix in the mapping information pair to generate the signed mapping pair; and a submitting unit 1200, configured to submit the signed mapping pair to the RA in the transit network.

Figure 13:
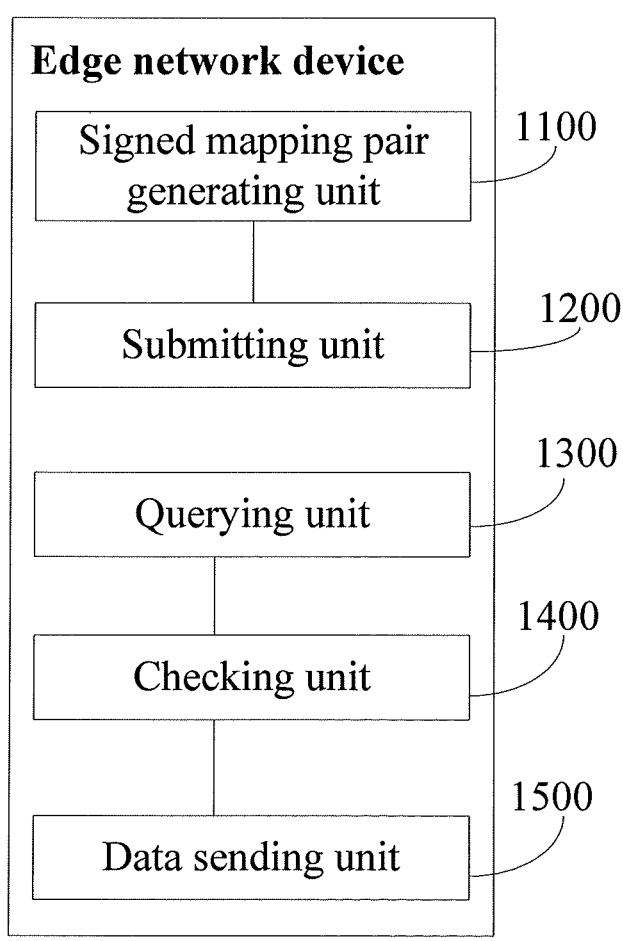
FIG. 13 illustrates an edge network device according to a second embodiment of the present invention.

FIG. 13 illustrates an edge network device according to a second embodiment of the present invention. In addition to the signed mapping pair generating unit 1100 and the submitting unit 1200, the edge network device further includes:

a querying unit 1300, configured to query the RA according to the prefix of the second edge network organization and obtain the signed mapping pair of the second edge network organization returned by the RA;

a checking unit 1400, coupled to the querying unit 1300 and configured to check whether the signed mapping pair of the second edge network organization is valid; and a data sending unit 1500, configured to send data to the second edge network organization according to the mapping information in the signed mapping pair after the checking unit 1400 determines that the signed mapping pair is valid.

Figure 14:
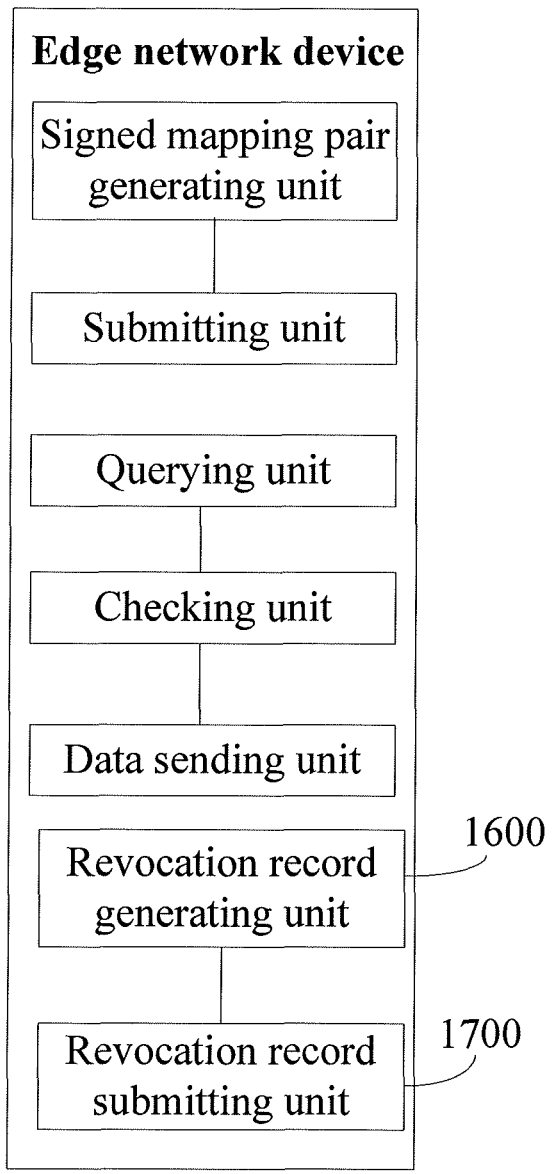
FIG. 14 illustrates an edge network device according to a third embodiment of the present invention.

FIG. 14 illustrates an edge network device according to a third embodiment of the present invention. In the third embodiment, the edge network device has the same structure as that in the second embodiment and further includes:

a revocation record generating unit 1600, configured to generate a signed mapping pair revocation record; and a revocation record submitting unit 1700, configured to submit the signed mapping pair revocation record to the RA to revoke the signed mapping pair matching the signed mapping pair revocation record.

Figure 15:
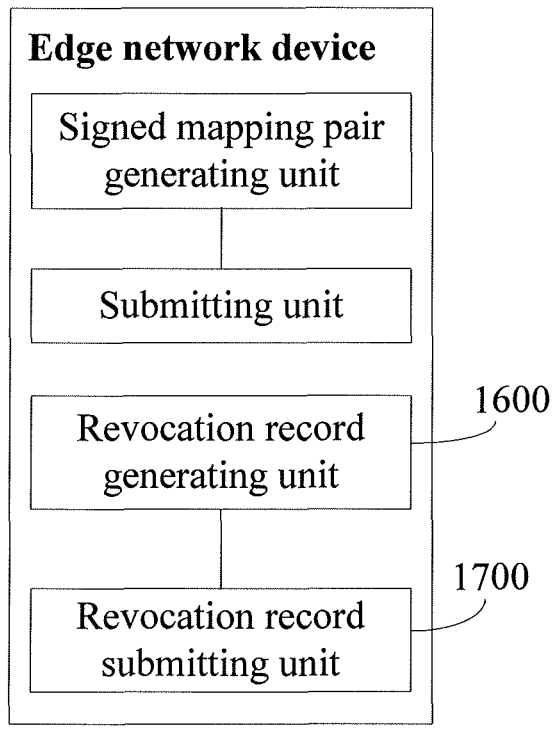
FIG. 15 illustrates a edge network device according to a fourth embodiment of the present invention.

FIG. 15 illustrates an edge network device according to a fourth embodiment of the present invention. In the fourth embodiment, the edge network device has the same structure as that in the first embodiment and further includes the revocation record generating unit 1600 and the revocation record submitting unit 1700.

Figure 16:
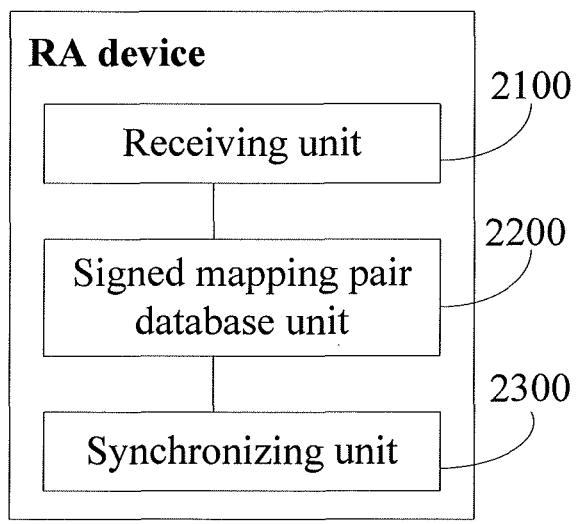
FIG. 16 illustrates an RA device according to a first embodiment of the present invention.

FIG. 16 illustrates an RA device according to a first embodiment of the present invention. The RA device includes:

a receiving unit 2100, configured to receive a signed mapping pair submitted by an edge network organization;

a signed mapping pair database unit 2200, configured to store the signed mapping pair received by the receiving unit 2100; and a synchronizing unit 2300, configured to synchronize the signed mapping pair stored by the signed mapping pair database unit 2200 to other RAs.

Figure 17:
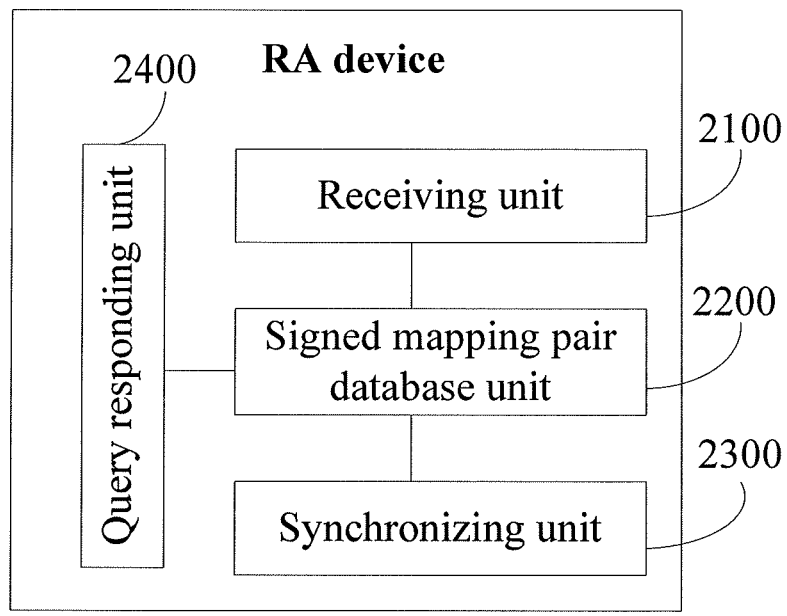
FIG. 17 illustrates an RA device according to a second embodiment of the present invention.

FIG. 17 illustrates an RA device according to a second embodiment of the present invention. In addition to the receiving unit 2100, the signed mapping pair database unit 2200, and the synchronizing unit 2300, the RA device in the second embodiment further includes:

a query responding unit 2400, configured to query a signed mapping pair corresponding to a prefix according to the prefix provided by an edge network organization and return the signed mapping pair to the edge network organization.

Figure 18:
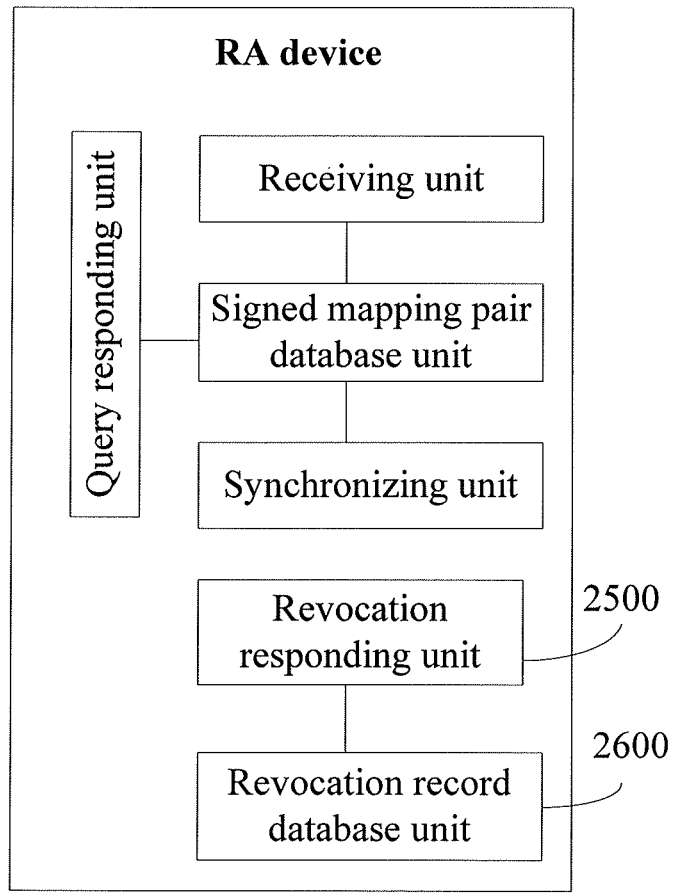
FIG. 18 illustrates an RA device according to a third embodiment of the present invention.

FIG. 18 illustrates an RA device according to a third embodiment of the present invention. In the third embodiment, the RA device has the same structure as that in the second embodiment and further includes:

a revocation responding unit 2500, configured to delete the signed mapping pair that matches a signed mapping pair revocation record provided by the edge network organization from the signed mapping pair database unit and synchronize the signed mapping pair revocation record to other RAs; and a revocation record database unit 2600, configured to store the signed mapping pair deleted by the revocation responding unit 2500.

Figure 19:
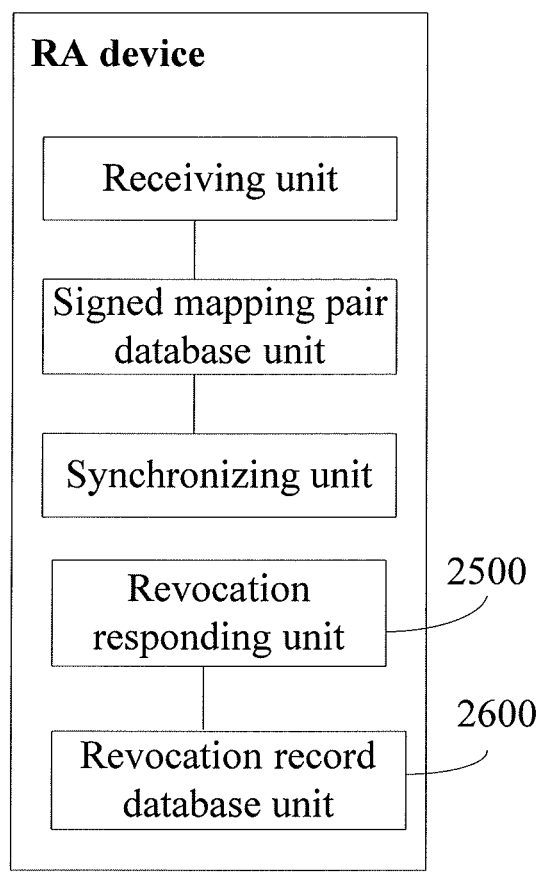
FIG. 19 illustrates an RA device according to a fourth embodiment of the present invention.

FIG. 19 illustrates an RA device according to a fourth embodiment of the present invention. In the fourth embodiment, the RA device has the same structure as that in the first embodiment and further includes the revocation responding unit 2500 and the revocation record database unit 2600.

To sum up, with the mapping information management method, the mapping information query method, the devices and the communications system provided in the embodiments of the present invention, a mapping information pair is signed by using the private key of a certificate, which ensures the reliability of the mapping information in registration, query and synchronization operations and eliminates the potential security problems of the prior art. Consequently, the reliability of the communications network or system is improved.

Through the descriptions of the preceding embodiments, those skilled in the art may understand that the present invention may be implemented by using hardware only or by using software and a necessary universal hardware platform. Based on such understandings, all or part of the technical solution under the present invention that makes contributions to the prior art may be essentially embodied in the form of a software product. The software product may be stored in a storage medium, which can be a magnetic disk, a compact disk read-only memory (CD-ROM), a read-only memory (ROM) or a random access memory (RAM). The software product includes a number of instructions that enable a computer device (personal computer, server, or network device) to execute the methods provided in the embodiments of the present invention.

The above descriptions are merely some exemplary embodiments of the present invention, but not intended to limit the scope of the present invention. Any modification, equivalent replacement, or improvement made according to the appended claims of the present invention should fall within the scope of the present invention.

What is claimed is:

1. A method for managing mapping information in network routing, comprising:
    signing a mapping information pair by using a private key of a certificate corresponding to a prefix in the mapping information pair to generate a signed mapping pair;
    submitting the signed mapping pair to a registration agent (RA) in a transit network;
    sharing, by the RA, the signed mapping pair with other RAs through data synchronization;
    generating, by an edge network organization, a signed mapping pair revocation record which comprises: prefix, available transit network IP address, mapping control information, revocation signature control information, and revocation signature;
    submitting, by the edge network organization, the generated signed mapping pair revocation record to the RA in the transit network; and
    deleting, by the RA, a signed mapping pair that matches the signed mapping pair revocation record and synchronizing the signed mapping pair revocation record to other RAs.

2. The method of claim 1, wherein the mapping information pair comprises at least the following information: prefix, Internet Protocol (IP) address of the transit network, and mapping control information; and the signed mapping pair comprises at least the following information: prefix, IP address of the transit network, mapping control information, signature control information, and signature, wherein:
    the signature control information comprises: certificate information used for the signature, a revocation point of the signed mapping pair, an expiration date, and signature algorithm information.

3. The method of claim 1, wherein the signing of the mapping information pair by using the private key of the certificate corresponding to the prefix in the mapping information pair to generate the signed mapping pair comprising:
    signing the prefix and an autonomous system number of the transit network, by using the private key of the certificate corresponding to the prefix to generate a first signed mapping pair, and submitting the first signed mapping pair to a transit network organization; and
    signing by the transit network organization, the first signed mapping pair and an Internet Protocol (IP) address of the transit network with a certificate that contains the autonomous system number to generate a second signed mapping pair.

4. The method of claim 3, wherein the first signed mapping pair comprises at least the following information: the prefix, the autonomous system number of the transit network, first signature control information, and a first signature, wherein:
    the first signature control information comprises: certificate information of an edge network organization, a revocation point of the first signed mapping pair, an expiration date, and signature algorithm information.

5. The method of claim 3, wherein the second signed mapping pair comprises at least the following information: the first signed mapping pair, the IP address of the transit network, mapping control information, second signature control information, and second signature, wherein:
    the second signature control information comprises: certificate information of the transit network organization, revocation point of the second signed mapping pair, the expiration date, and the signature algorithm information.

6. An edge network device, comprising:
    a signed mapping pair generating unit, configured to sign a mapping information pair by using a private key of a certificate corresponding to a prefix in the mapping information pair to generate a signed mapping pair;
    a submitting unit, configured to submit the signed mapping pair to a registration agent (RA) in a transit network;
    a revocation record generating unit, configured to generate a signed mapping pair revocation record; and
    a revocation record submitting unit, configured to submit the signed mapping pair revocation record to an RA to revoke a signed mapping pair that matches the signed mapping pair revocation record and synchronizing the signed mapping pair revocation record to other RAs.

7. The edge network device of claim 6, further comprising:
a querying unit, configured to query an RA according to a prefix of a second edge network organization, and obtain a signed mapping pair of the second edge network organization returned by the RA;
a checking unit, coupled to the querying unit and configured to check whether the signed mapping pair of the second edge network organization is valid; and
a data sending unit, configured to send data to the second edge network organization according to mapping information in the signed mapping pair after the checking unit determines that the signed mapping pair is valid.

8. A registration agent (RA) device, comprising:
a receiving unit, configured to receive a signed mapping pair submitted by an edge network organization;
a signed mapping pair database unit, configured to store the signed mapping pair received by the receiving unit;
a synchronizing unit, configured to synchronize the signed mapping pair stored by the signed mapping pair database unit to other RAs;
a revocation responding unit, configured to delete a signed mapping pair that matches a signed mapping pair revocation record provided by the edge network organization from the signed mapping pair database unit and synchronize the signed mapping pair revocation record to other RAs.

9. The RA device of claim 8, further comprising:
a query responding unit, configured to query a signed mapping pair corresponding to a prefix according to the prefix provided by the edge network organization, and return the signed mapping pair to the edge network organization.

10. The RA device of claim 8, further comprising:
a revocation record database unit, configured to store the signed mapping pair deleted by the revocation responding unit.

11. A communications system, comprising:
an edge network device, configured to sign a mapping information pair with a private key of a certificate corresponding to a prefix in the mapping information pair to generate a signed mapping pair and submit the signed mapping pair to a registration agent (RA) device;
the RA device, configured to receive the signed mapping pair submitted by the edge network device and share the signed mapping pair with other RAs through data synchronization;
an edge network organization, generated a signed mapping pair revocation record which comprises: prefix, available transit network IP address, mapping control information, revocation signature control information, and revocation signature;
the edge network organization, submitted the generated signed mapping pair revocation record to the RA in the transit network; and
the RA, deleted a signed mapping pair that matches the signed mapping pair revocation record and synchronizing the signed mapping pair revocation record to other RAs.

12. The communications system of claim 11, wherein the RA device comprises:
a receiving unit, configured to receive a signed mapping pair submitted by an edge network organization;
a signed mapping pair database unit, configured to store the signed mapping pair received by the receiving unit; and
a synchronizing unit, configured to synchronize the signed mapping pair to other RAs.

* * * * *